Oct. 20, 1959 W. B. EDDISON ET AL 2,909,017
METERING MECHANISM
Filed March 15, 1954 12 Sheets-Sheet 1

INVENTORS:
WILLIAM BARTON EDDISON
WARREN E. ERICKSON
BY
Attorneys

Oct. 20, 1959 W. B. EDDISON ET AL 2,909,017
METERING MECHANISM
Filed March 15, 1954 12 Sheets-Sheet 2

INVENTORS:
WILLIAM BARTON EDDISON
WARREN E. ERICKSON
BY

Attorneys

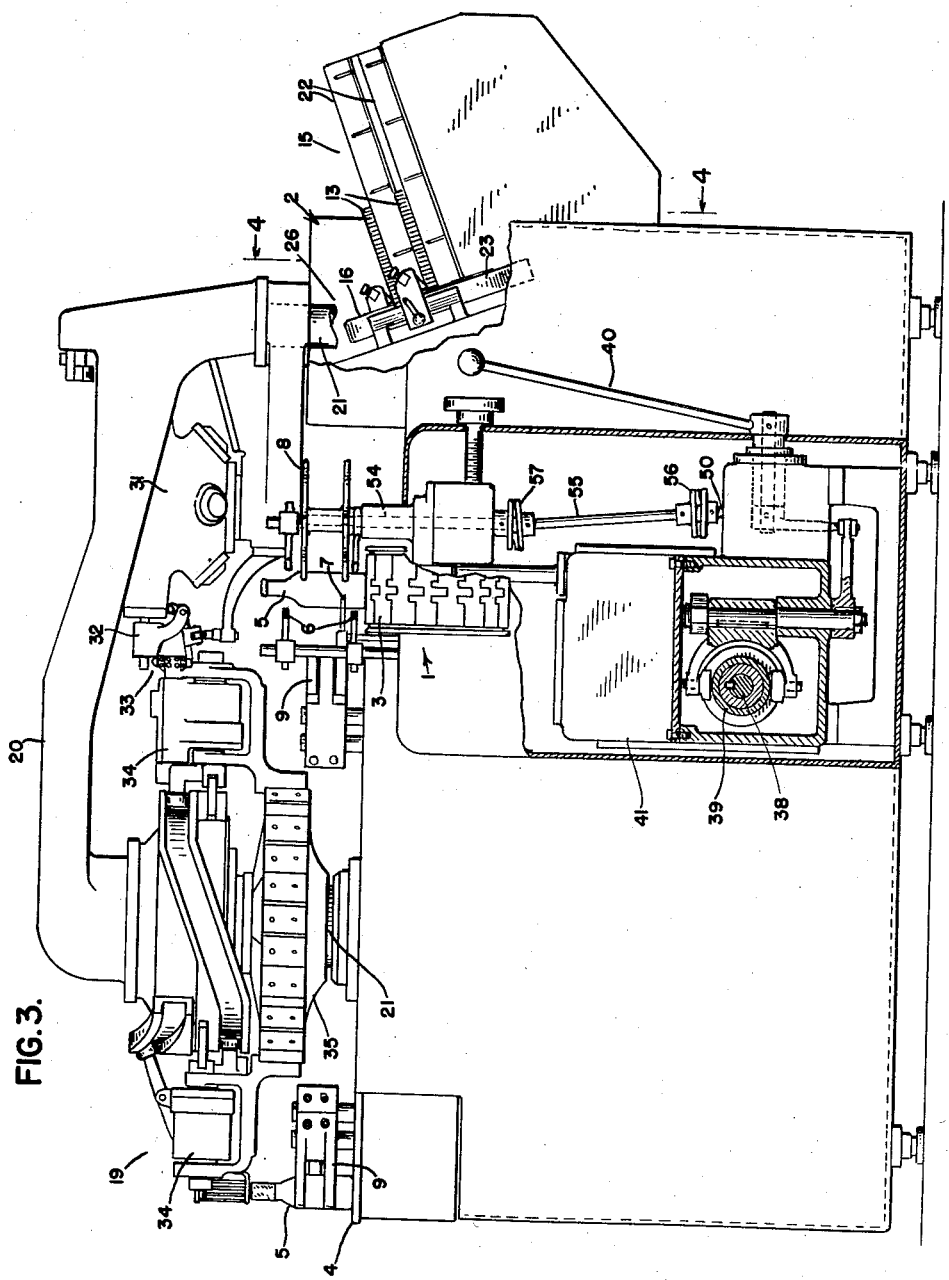

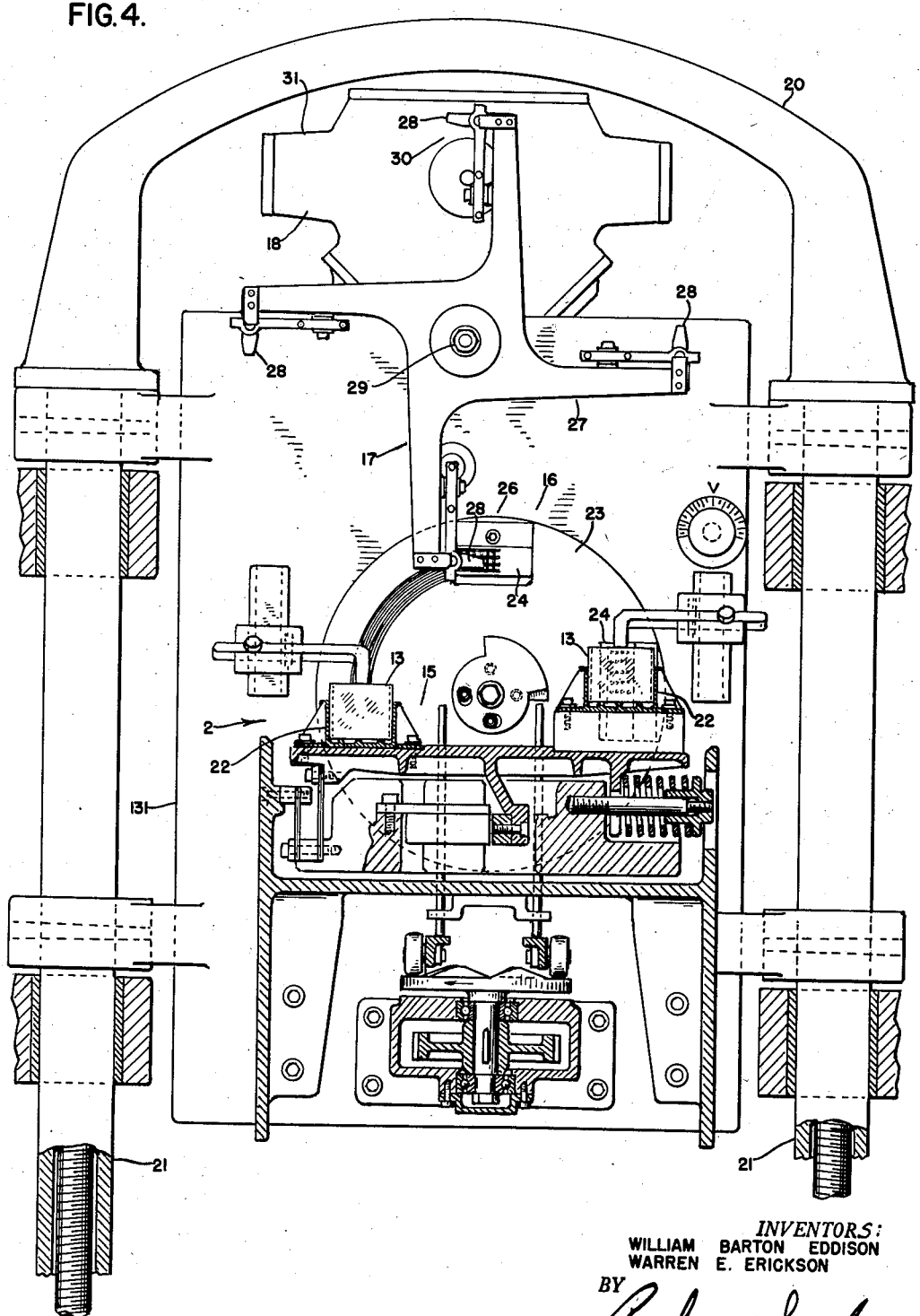

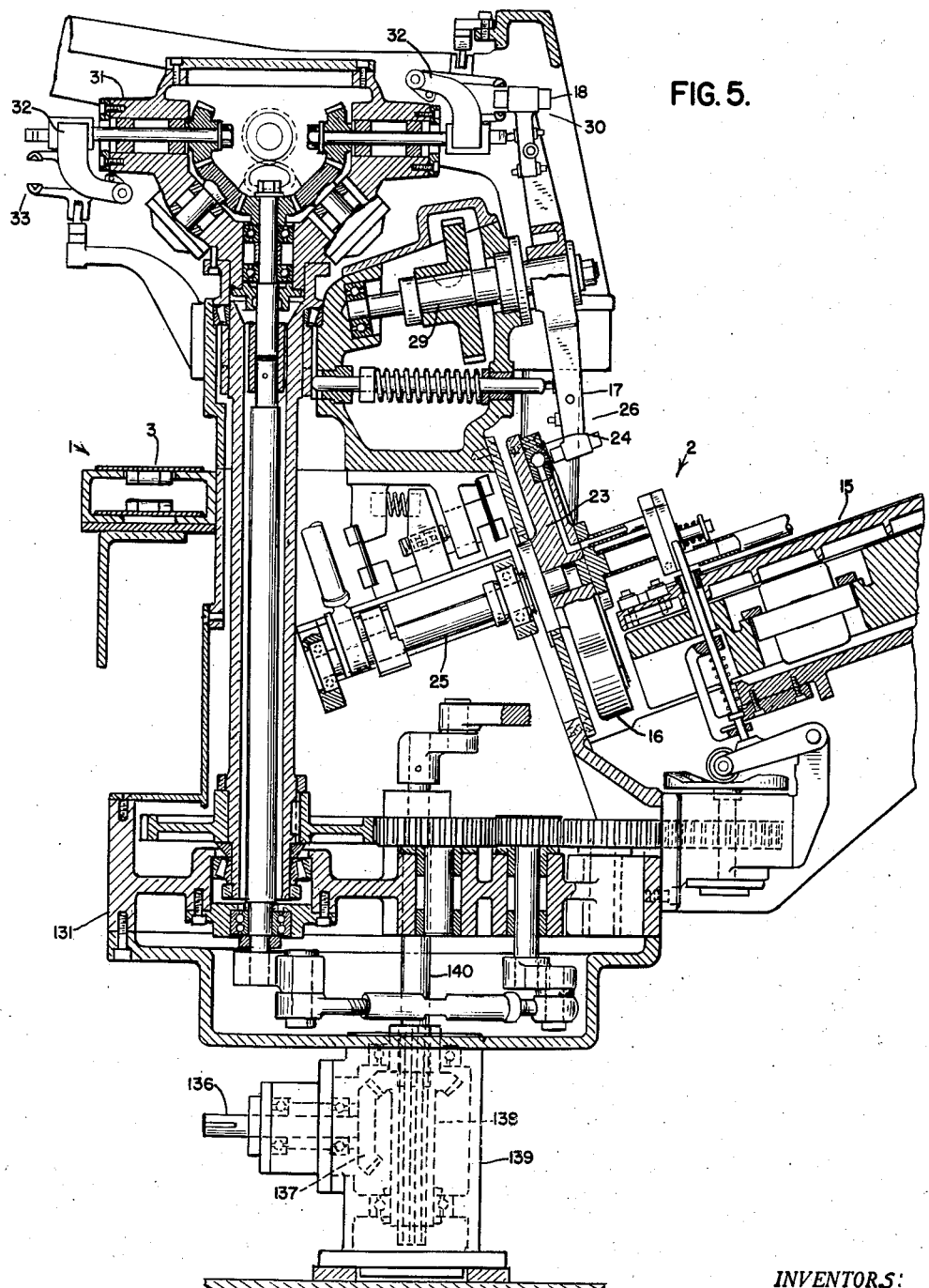

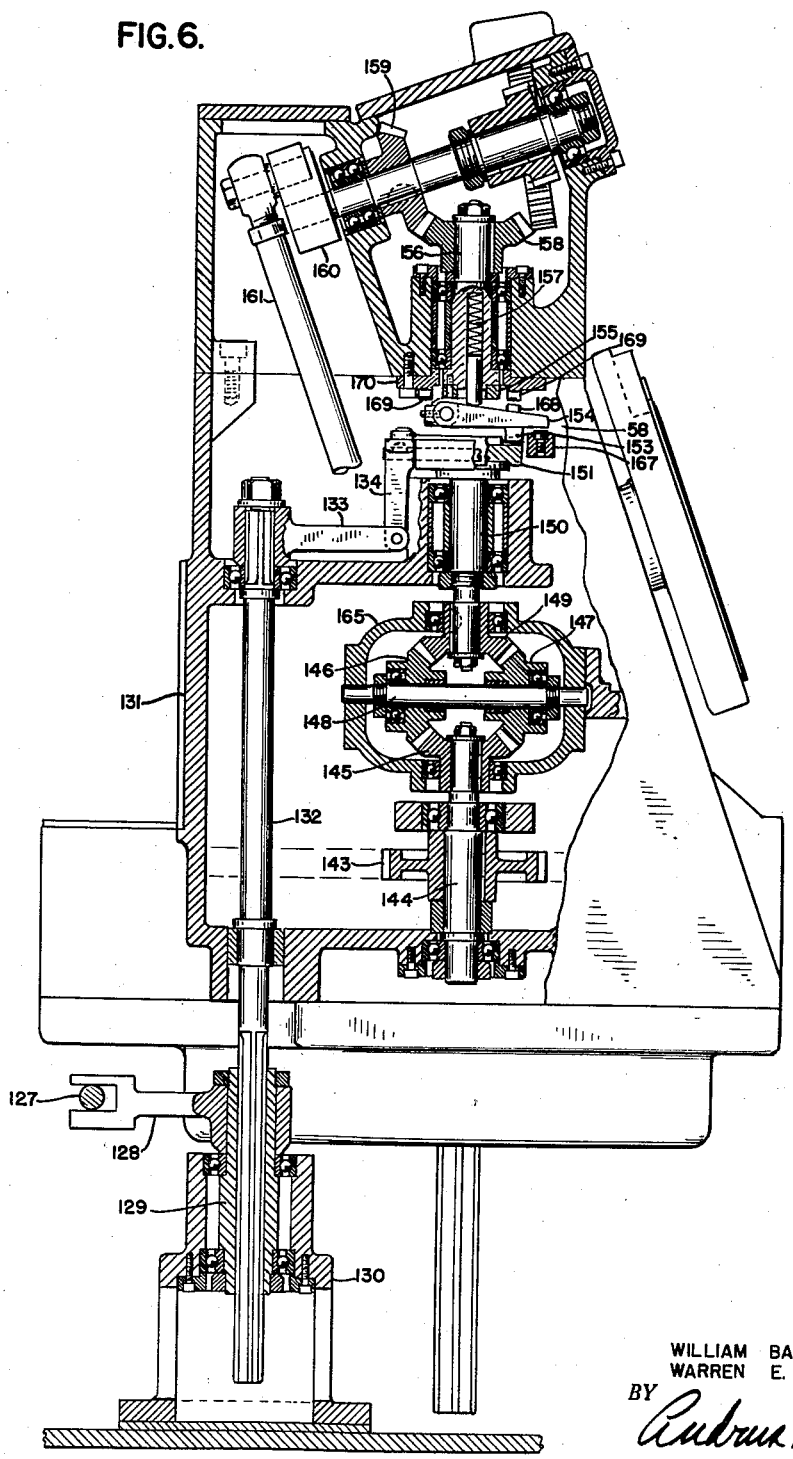

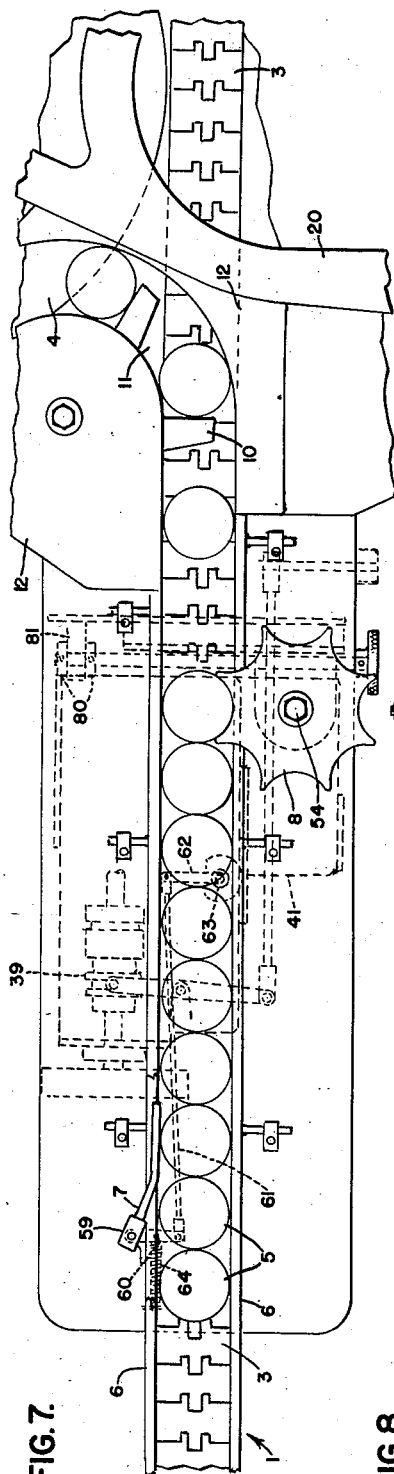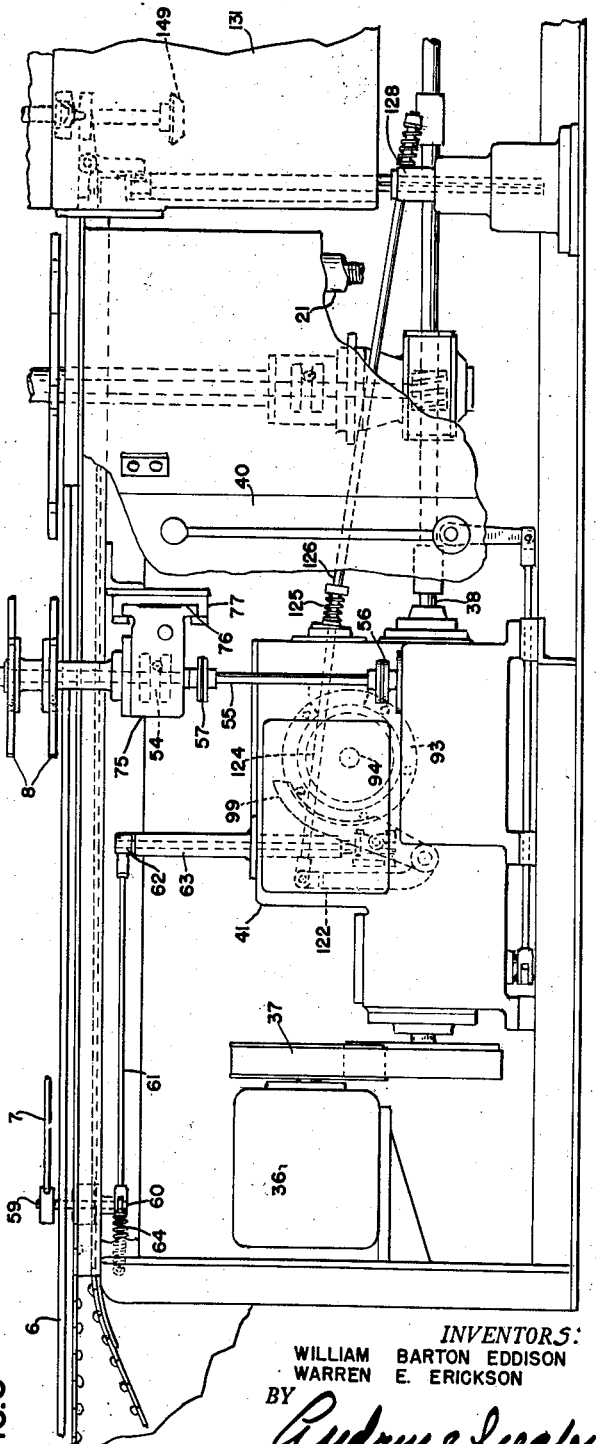

Oct. 20, 1959  W. B. EDDISON ET AL  2,909,017
METERING MECHANISM
Filed March 15, 1954   12 Sheets-Sheet 8

INVENTORS:
WILLIAM BARTON EDDISON
WARREN E. ERICKSON
BY
Andrus & Scales
Attorneys

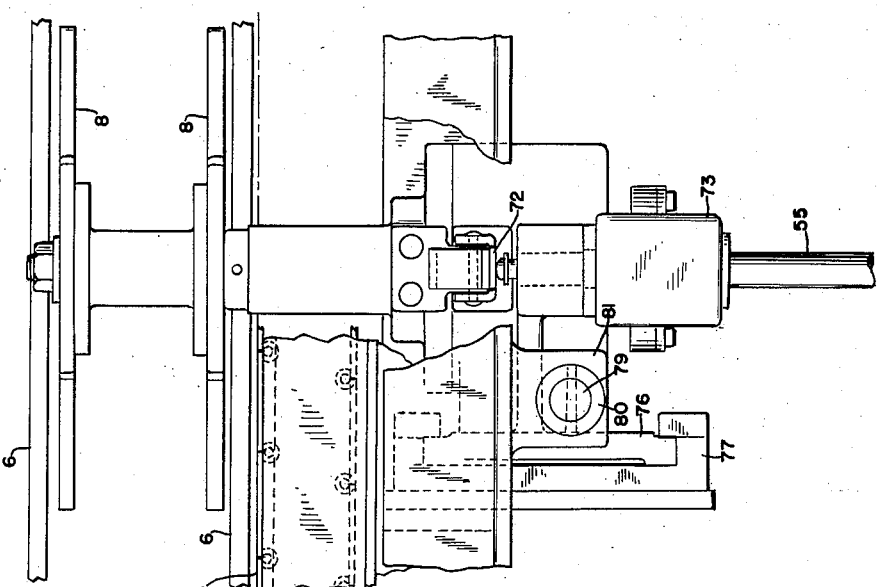
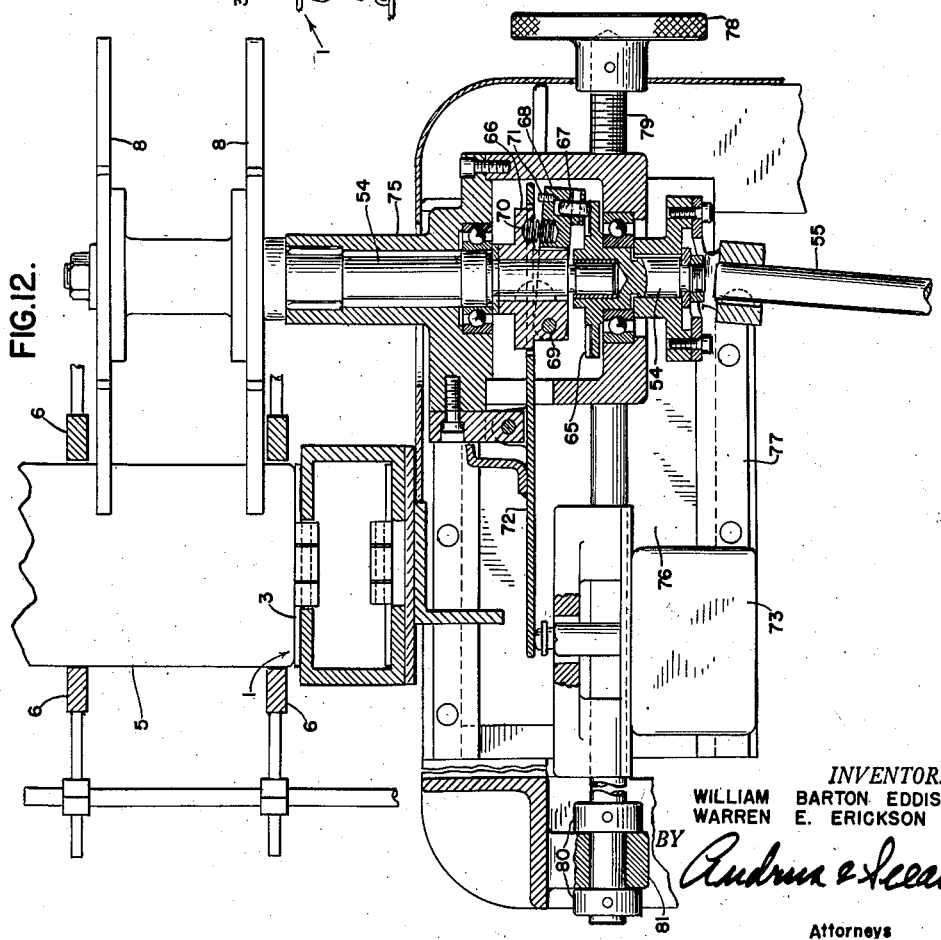

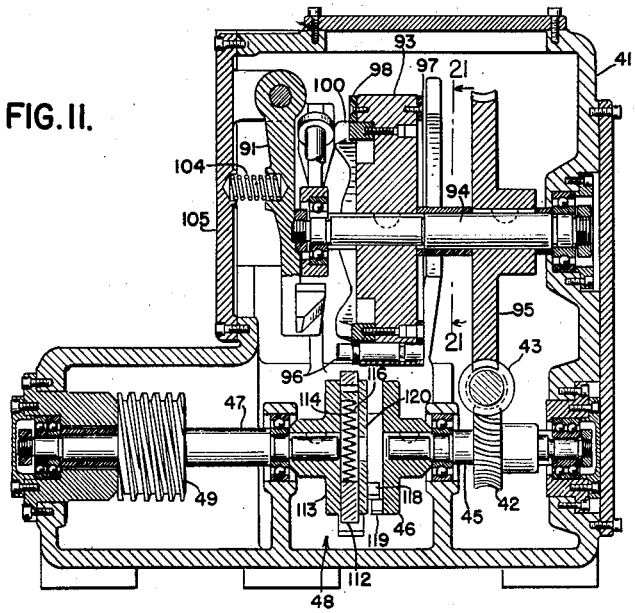

Oct. 20, 1959  W. B. EDDISON ET AL  2,909,017
METERING MECHANISM
Filed March 15, 1954  12 Sheets—Sheet 11
FIG. 17.  FIG. 18.  FIG. 19.
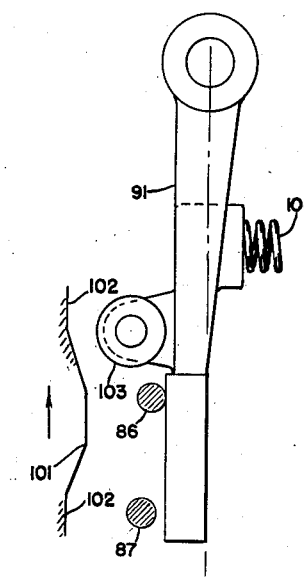
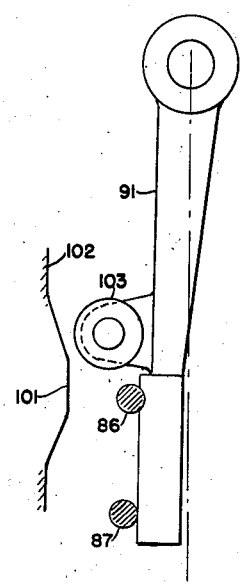
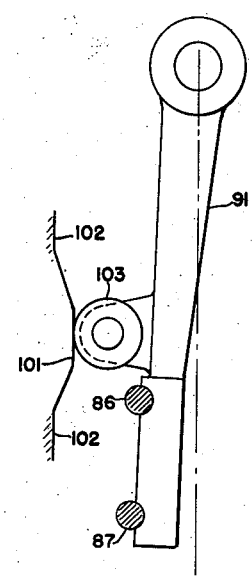
FIG. 20.  FIG. 21.
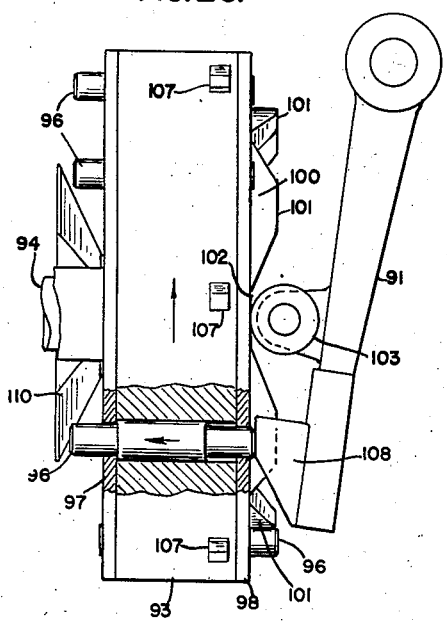
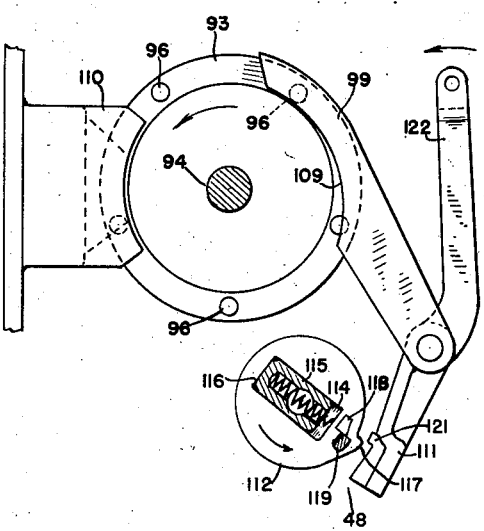
INVENTORS:
WILLIAM BARTON EDDISON
WARREN E. ERICKSON
BY
Andrus e Sceales
Attorneys

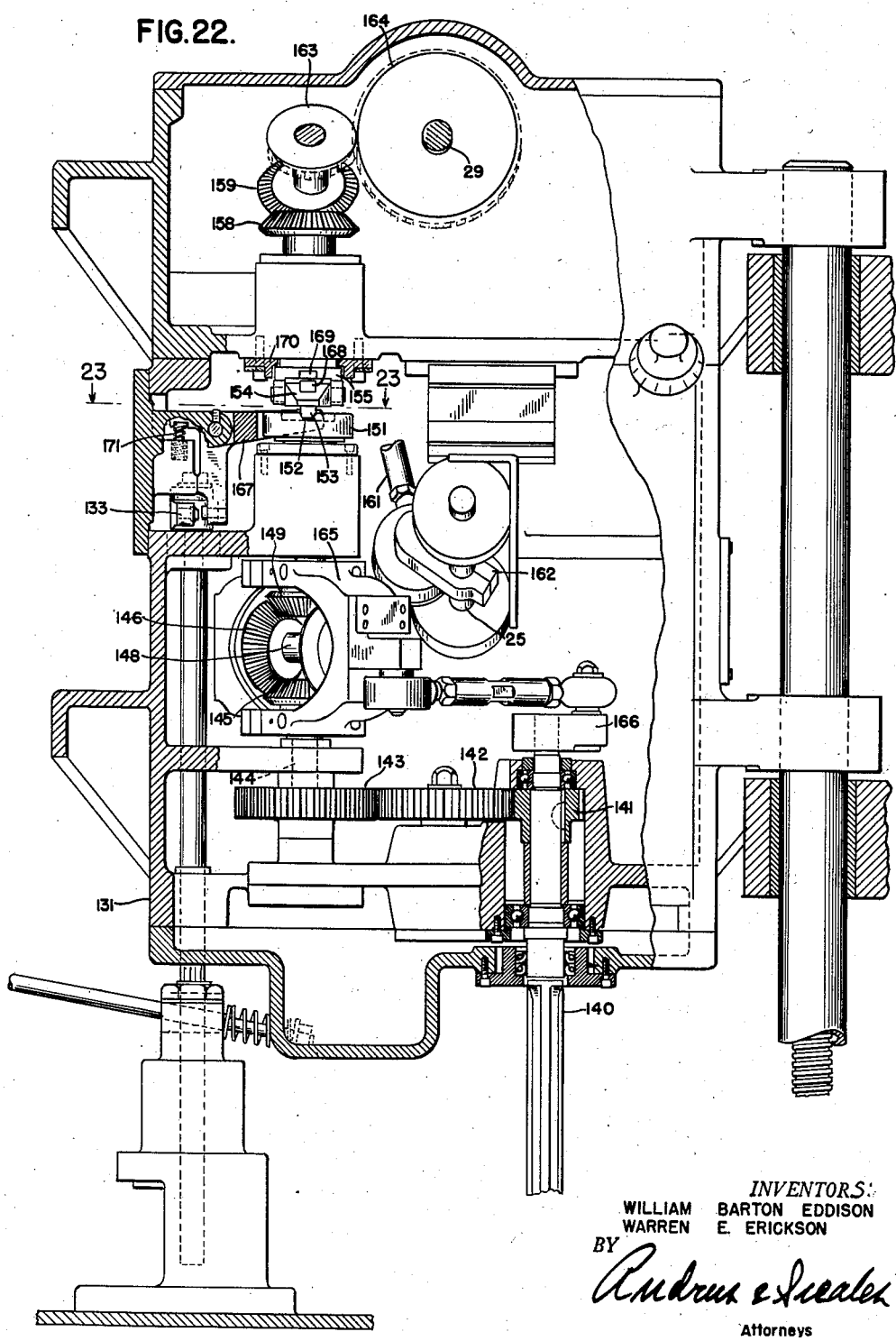

United States Patent Office 2,909,017
Patented Oct. 20, 1959

2,909,017

METERING MECHANISM

William Barton Eddison, Ardsley-on-Hudson, N.Y., and Warren E. Erickson, Madison, Wis., assignors to Gisholt Machine Company, Madison, Wis., a corporation of Wisconsin Application March 15, 1954, Serial No. 416,174

22 Claims. (Cl. 53—71)

This invention relates to metering mechanism for use on conveyor lines feeding containers such as bottles and the like to various machines such as filling, capping, labeling and sealing machines.

The purpose of metering mechanism is generally twofold: (1) to space the containers on the conveyor prior to their entry into the intake pocket wheel and from there into the machine, and (2) to shut down the machine or certain parts thereof in the event of a failure or lack of containers on the intake line.

Heretofore, metering mechanism as applied to bottling machines, as an example, have been susceptible to jamming and breaking of bottles largely due to the fact that the shut down mechanism was not instantaneously responsive to a failure of a bottle or bottles and not properly coordinated with the machine. Furthermore, prior construction failed to take into account certain inertia forces in the stopping and starting of the machine.

The present invention has overcome all jamming of bottles in the metering wheel and substantially all breaking of bottles in the machine.

In carrying out the invention the means for detecting the presence of containers entering the metering wheel is disposed a distance of several containers ahead of the wheel whereby the wheel is never empty of containers when stopped by actuation of the detecting means upon failure of a container at the position of the means.

The container detecting means is constructed to stop the metering wheel and the machine or a part thereof upon the skip of a single container at the detecting position, and to restart the same only after a predetermined reserve of containers is disposed ahead of the metering wheel.

Where the machine upon which the invention is employed is adapted to apply labels, caps, stamps or seals to the containers in succession from a magazine and to have a number of labels, caps, stamps or seals traveling simultaneously and in succession from the magazine to the point of application, the metering wheel is disposed to be stopped by an absence of a container at the detecting position in correlation to a stopping of the means for stripping the label, cap, stamp or seal from the magazine, while maintaining operation of the remainder of the machine, whereby the number of containers continuing through the machine after stopping of the metering wheel equals the number of labels, caps, stamps or seals continuing through the machine after stopping of the stripping means.

The same correlation is provided upon restarting of the metering wheel whereby the labels, caps, stamps or seals are also started from the magazine at the right time to apply to the first and successive containers as they reach the applying station in the machine.

In carrying out the invention the restarting of the metering wheel and of the stripping means is always timed with respect to the continuous operation of the machine so that containers are not jammed and there is no danger of jamming the transfer mechanism for the labels, caps, stamps or seals, as the case may be.

The invention has been applied to a machine for applying tubular sealing bands to bottle tops of the type described and claimed by the present inventors in copending application Serial No. 416,184, now U.S. Patent No. 2,835,088, filed on even date herewith, and is so illustrated in the accompanying drawings.

In the drawings:

Fig. 3 is a vertical transverse section taken on line 3—3 of Fig. 1 and with parts broken away;

Fig. 4 is an enlarged front elevation showing the seal handling mechanism partially in section and taken on line 4—4 of Fig. 3;

Fig. 5 is an enlarged detail vertical transverse section showing the seal handling mechanism partially in section and partially in elevation;

Fig. 6 is an enlarged vertical section showing the drive for the seal handling mechanism of Fig. 5;

Fig. 7 is an enlarged top plan view of the metering wheel and trigger, with the top of the housing broken away and showing parts in section;

Fig. 8 is a front elevation of the parts shown in Fig. 7, with the housing and frame broken away and sectioned;

Fig. 11 is a section taken on line 11—11 of Fig. 10;

Fig. 12 is a vertical axial section through the metering wheel;

Fig. 13 is a rear elevation of the metering wheel mounting with parts in section;

Fig. 14 is a detail section of the escapement mechanism;

Fig. 15 is a detail section of the escapement bracket taken on line 15—15 of Fig. 14 and showing the escapement mechanism in plan view with parts broken away and sectioned to show the spring;

Fig. 16 is a face view of the escapement mechanism;

Fig. 17 is a schematic view showing the cam mechanism taken in general on line 17—17 of Fig. 14 sectioning the escapement pins, and showing the parts in the position of full drive for the machine;

Fig. 18 is similar to Fig. 17 showing the parts as positioned after initial operation of the escapement mechanism;

Fig. 19 is similar to Fig. 18 showing the parts after tripping of the second escapement pin;

Fig. 20 is a section taken generally on line 20—20 of Fig. 14, but showing the parts in cam engagement with the cam roller in a valley of the cam.

Fig. 21 is a rear elevation of the pin wheel and clutch lever taken by sectioning the pin wheel shaft on line 21—21 of Fig. 11;

Fig. 22 is a vertical step section showing the drive for the seal handling mechanism;

Figure 1:
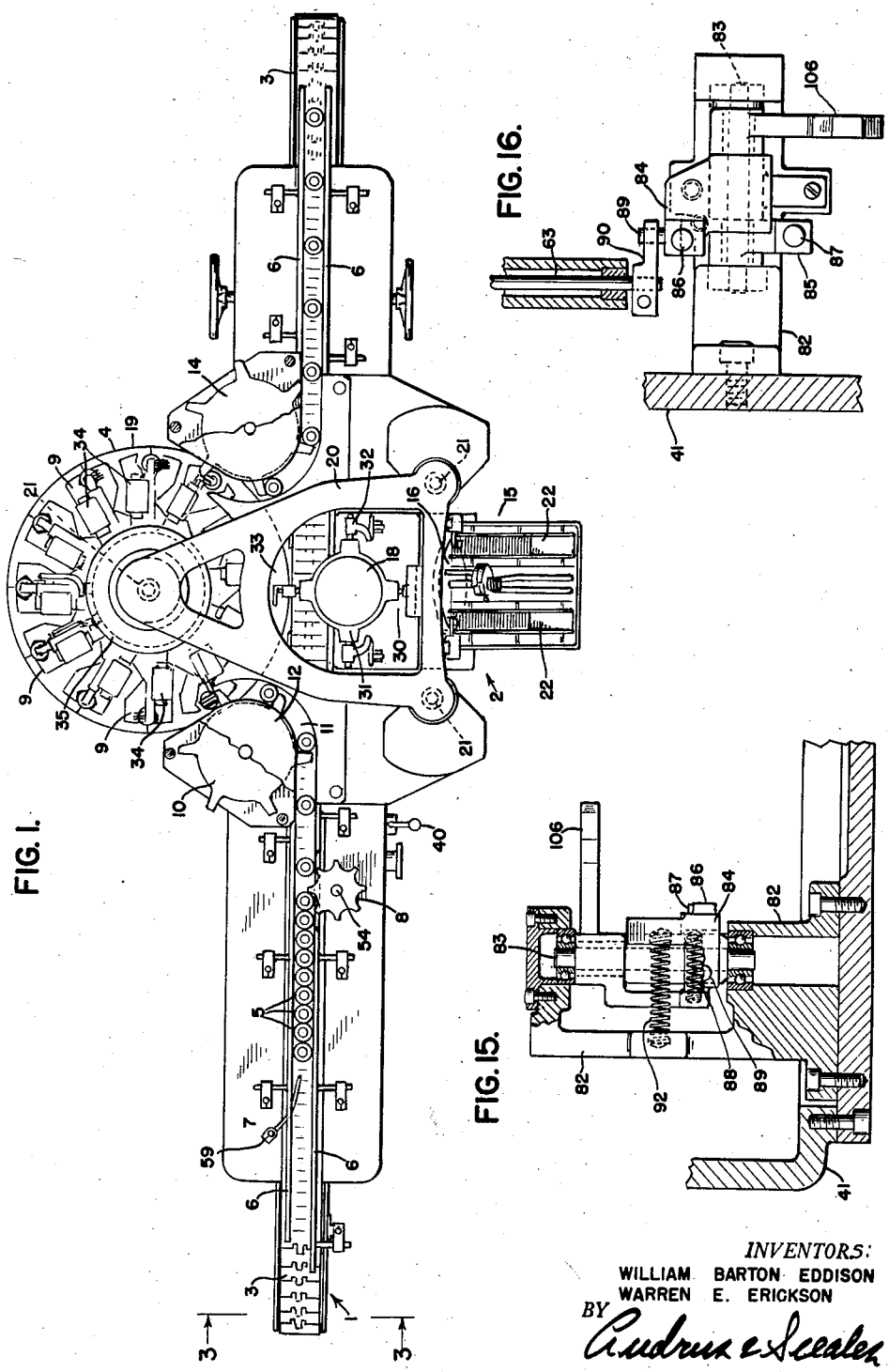
Figure 1 is a top plan view of the machine having the metering mechanism of the present invention incorporated therein.
Figure 2:
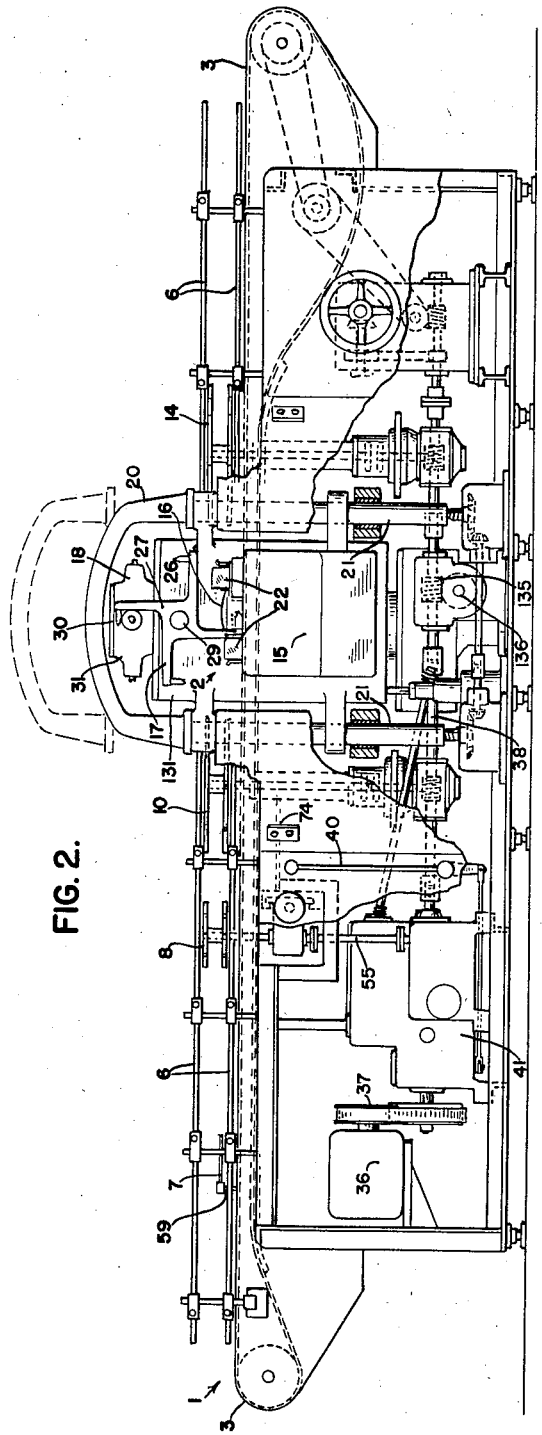
Fig. 2 is a front elevation of the machine with parts broken away.

The machine illustrated comprises a bottle transporting mechanism 1 and a seal handling and applying mechanism 2.

The bottle transporting mechanism 1 comprises a table-high straight bottle conveyor 3 and an adjacent rotary table 4 which receives bottles 5 from the conveyor and delivers the bottles back to the conveyor in succession.

The bottles 5 are guided on conveyor 3 by means of side rails 6 which are adjustable in height and in lateral spacing on opposite sides of the conveyor to accommodate different size bottles.

As the bottles 5 pass along the conveyor 3 they pass a trigger arm 7 which detects the presence of bottles by being pushed to one side of the conveyor by each bottle as it passes. The bottles 5 next pass into the metering wheel 8 which operates to hold back the line of bottles and to release bottles one by one in predetermined spaced relation to correspond with the spacing of the bottles in successive clamps 9 on table 4.

After leaving the metering wheel 8 the bottles 5 enter the intake pocket wheel 10 which rotates on a vertical axis and has radial arms entering the path of the bottles above the conveyor 3 adjacent the table 4. Each arm of pocket wheel 10 engages a bottle 5 and pushes it in a circular path defined by a slot 11 in a top plate 12 constituting in effect a continuation of the guide rails 6 which terminate at the entrance to the pocket wheel.

The intake pocket wheel 10 sweeps the bottles 5 successively onto the table 4 and into the corresponding clamps 9, after which the arms of the pocket wheel rotate away from the table 4 and leave the bottles clamped thereon.

As the bottles 5 continue around the table 4, seals 13 are applied thereto in succession and then the bottles with the seals thereon are unclamped and picked up successively by corresponding arms of an exhaust pocket wheel 14 which sweeps the bottles from the table 4 and onto the conveyor 3 for discharge from the machine.

The seal handling and applying mechanism 2 comprises a seal supply mechanism 15, seal stripping mechanism 16, seal spearing mechanism 17, seal transfer mechanism 18 and seal applying mechanism 19, the construction of which is similar to that disclosed in the copending application referred to above. A detail description of these several mechanisms is not necessary to an understanding of the present invention and will not be given here.

The seal applying mechanism 2 is mounted upon a frame 20 which is adjustably supported as to height by means of the three jacks 21 to accommodate different height bottles on conveyor 3 and table 4.

The seal supply mechanism 15 is preferably constructed in accordance with the description given in copending application Serial No. 403,332, now U.S. Patent No. 2,794,636, filed January 11, 1954, by the present inventors.

Mechanism 15 comprises a pair of laterally spaced troughs 22 adapted to contain packs of seals 13 and tilted downwardly to feed the seals toward the seal stripping mechanism 16.

The stripping mechanism 16 is shown in the copending application first referred to above and comprises a stripper disc 23 having a pair of stripper blocks 24 on its face disposed approximately 90° apart. The disc 23 is mounted on a shaft 25 disposed parallel to troughs 22 and which is adapted to oscillate through 90° whereby the blocks 24 alternately register with the lower rear end of the corresponding troughs 22.

The seals 13 are stripped successively from alternate troughs 22 by the corresponding stripper blocks 24 and carried to a pick-off station 26 at the top of the disc.

The seals 13 are picked off from the corresponding blocks 24 at station 26 by the seal spearing mechanism 17, the construction of which is described in detail in the application first referred to above.

The seal spearing mechanism 17 comprises in general a rotary spider 27 having four generally radial arms, each carrying a spear 28 at its outer extremity and which is adapted to enter a corresponding seal 13 at station 26 and to pick the same off from disc 23. The spider 27 is mounted on a shaft 29 which rotates intermittently to provide a dwell in the rotation of the spider every time a spear 28 reaches station 26 to provide for the clamping of a seal on the spear as shown, for instance, in copending application Serial No. 408,758, now U.S. Patent No. 2,752,030, filed February 8, 1954, by Warren E. Erickson, one of the present inventors.

As each successive spear 28 dwells at station 26 a corresponding diametrically opposite spear 28 delivers a seal 13 to a pick-up station 30 at the top of the spider where the seal is unclamped and picked up by the seal transfer mechanism 18.

The transfer mechanism 18 comprises a rotary spider 31 carrying four two-finger heads 32 each disposed to register successively with a seal at station 30 as the successive spears 28 deliver seals to the station. The spider 31 rotates continuously on a vertical axis and heads 32 thereon transfer corresponding seals 13 successively to a transfer station 33 diametrically opposite from station 30.

During the transfer of a seal 13 from pick-up station 30 to transfer station 33 the head 32 is rotated on a horizontal axis generally radial of spider 31 to reverse the direction of the fingers of the head as described in the first-named copending application identified above.

At station 33 the successive seals 13 are picked up by a corresponding eight-finger head 34 carried by the continuously rotating member 35 of the applying mechanism 19. The member 35 is above table 4 and rotates concentric therewith so that heads 34 register the seals with the tops of corresponding bottles 5 clamped on the table. The seals 13 are applied one by one on the bottles 5 as the latter move with table 4 from intake pocket wheel 10 to the exhaust pocket wheel 14.

The drive for the machine comprises an electric motor 36 connected by a belt 37 to the main drive shaft 38 extending longitudinally of the machine generally beneath the conveyor 3. Shaft 38 is made up of a number of separate aligned shaft sections coupled together end to end, the first coupling being a manually operable clutch 39 actuated by hand lever 40 on the front of the machine.

Clutch 39 is contained in one end of the metering gear box 41. The second section of shaft 38 in gear box 41 carries two oppositely pitched worm gears 42 and 43.

Worm gear 42 drives a gear 44 on the stub shaft 45 which carries a clutch driver 46 on one end. A shaft 47 aligned with shaft 45 is driven by driver 46 through a suitable throwout clutch 48 and carries a worm gear 49 which in turn drives the vertical shaft 50 through a gear 51 meshing therewith and spur gears 52 and 53.

Shaft 50 extends upwardly through the top of gear box 41 and is connected to drive the shaft 54 of the metering wheel 8 by a flexible shafting in the form of a connecting shaft 55 and universal couplings 56 and 57 at its opposite ends.

The worm gear 43 drives the trip mechanism in gear box 41 which actuates throwout clutch 48 and a similar clutch 58 in the drive for mechanisms 16 and 17.

The trigger 7 is carried by a vertical pivot shaft 59 adjacent conveyor 3 and which is connected by a suitable lever arm 60 and link 61 to a lever arm 62 on a vertical shaft 63 extending downwardly into gear box 41. A spring 64 between the machine frame and lever arm 60 biases shaft 59 in a direction maintaining the free end of trigger 7 across the path of the bottles on conveyor 3.

The shaft 63 serves to actuate the trip mechanism in gear box 41 whereby the clutches 48 and 58 are maintained open so long as trigger 7 extends across the path of the bottles and are closed following the pivoting of trigger 7 and holding of the same to one side of the bottle path as when a continuous succession of bottles moves past the trigger on conveyor 3.

In the construction shown the length of conveyor 3 from trigger 7 to the metering wheel 8 accommodates approximately seven bottles of the comparative size indicated in abutting succession. In other words, as shown in Figs. 7 and 8, when seven bottles have moved to a position on conveyor 3 to be held from further forward movement on the conveyor by reason of the stationary metering wheel 8, the trigger 7 will be held to one side by the seventh bottle, whereupon the trip mechanism functions to permit closing of clutches 48 and 58 and to thereby simultaneously start the drive of the metering wheel 8 and the stripper and spear mechanisms 16 and 17, respectively.

As the bottles 5 are fed to the machine by the metering wheel 8 a continuous stream of bottles passes trigger 7 and maintains the same to one side of the conveyor 3. Should a space between two successive bottles permit the trigger 7 to pivot across the path of the bottles momentarily, the shaft 63 will actuate the trip mechanism to open clutches 48 and 58 and stop the metering wheel 8 and mechanisms 16 and 17. This latter functioning of the trip mechanism occurs quite regardless of the trigger action being only momentary followed by more bottles pushing the trigger to one side.

In this way a minimum number of bottles will be maintained ahead of the metering wheel 8, preferably not less than five, for the size of bottles shown in the drawing, and after stopping of the metering wheel it will not restart until at least a given number of bottles are ahead of the metering wheel, preferably at least seven bottles. In other words, from five to seven bottles of the relative size indicated are maintained ahead of the metering wheel 8 at all times and consequently there never can be any jamming of bottles in the metering wheel since there will always be a bottle located in the entering pocket of the wheel.

Any emergency load on the metering wheel will be taken care of by a safety clutch in its drive. The safety clutch, as shown in Fig. 12, is between two sections of shaft 54, and comprises a driver plate 65 on the upper end of the lower section of shaft 54, and a clutch disc 66 secured to the lower end of the upper section of shaft 54.

The clutch disc 66 is driven from driver plate 65 by means of a roller 67 normally disposed in any one of eight corresponding recesses in the top of plate 65 and operatively supporting a carriage 68 pivotally secured to clutch disc 66 by pin 69 diametrically opposite from roller 67.

The roller carriage 68 is biased downwardly from clutch disc 66 by spring 70 disposed between the same and adjacent roller 67 to maintain the latter in a recess in plate 65. An overload on the metering wheel 8 will effect a rolling of roller 67 out of its recess, which lifts carriage 68.

Carriage 68 has an upwardly extending pin 71 which is adapted to engage a pivotal switch arm 72 upon lifting of the carriage and to actuate a micro-switch 73 to open the holding relay of the circuit of motor 36, and thereby stop the machine. The machine can only be started thereafter by closing of the motor circuit and resetting of the holding circuit (not shown) by pressing of the manual start button 74 as more fully described in the copending application first identified above.

The shaft 54 is mounted in suitable bearings in a housing 75 which has a T slide base 76 disposed in a slide way 77 on the frame of the machine as shown in Figs. 12 and 13, to provide for adjustment of the metering wheel 8 in and out relative to conveyor 3 to accommodate metering wheels of different diameters and thereby provide for the use of interchangeable metering wheels with circumferential recesses of different sizes and shapes to accommodate different sizes and shapes of bottles. The hand wheel 78 is secured to the forward end of a screw 79 which threads through housing 75 and is secured against axial movement by a pair of spaced collars 80 at its rear end confining therebetween a lug 81 depending from the machine frame.

Figure 9:
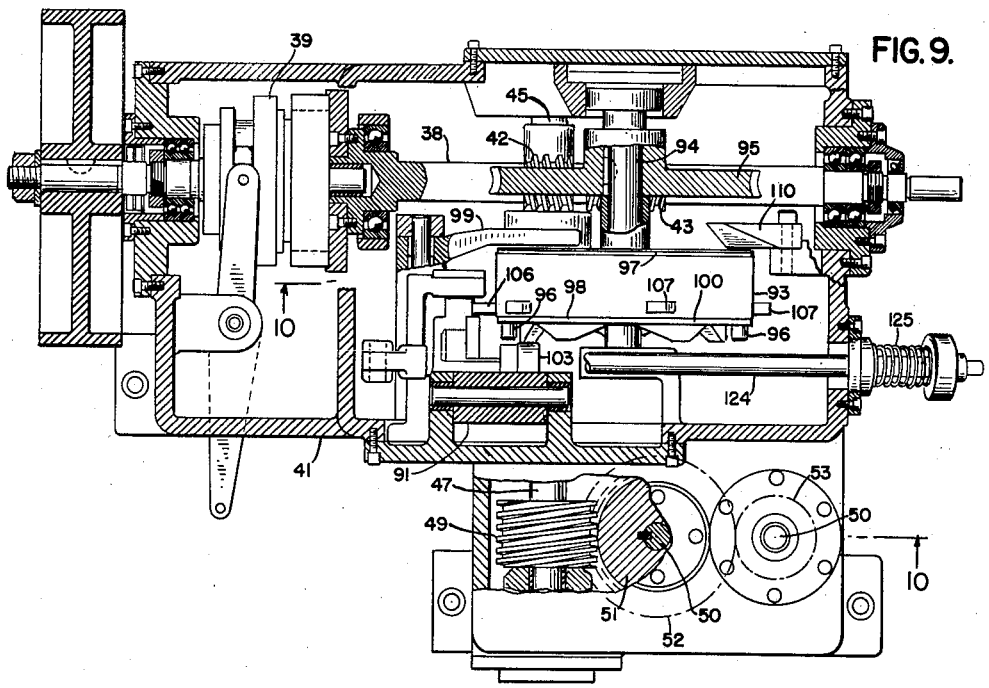
Fig. 9 is an enlarged top plan view of the metering box with the cover removed and parts in section.
Figure 10:
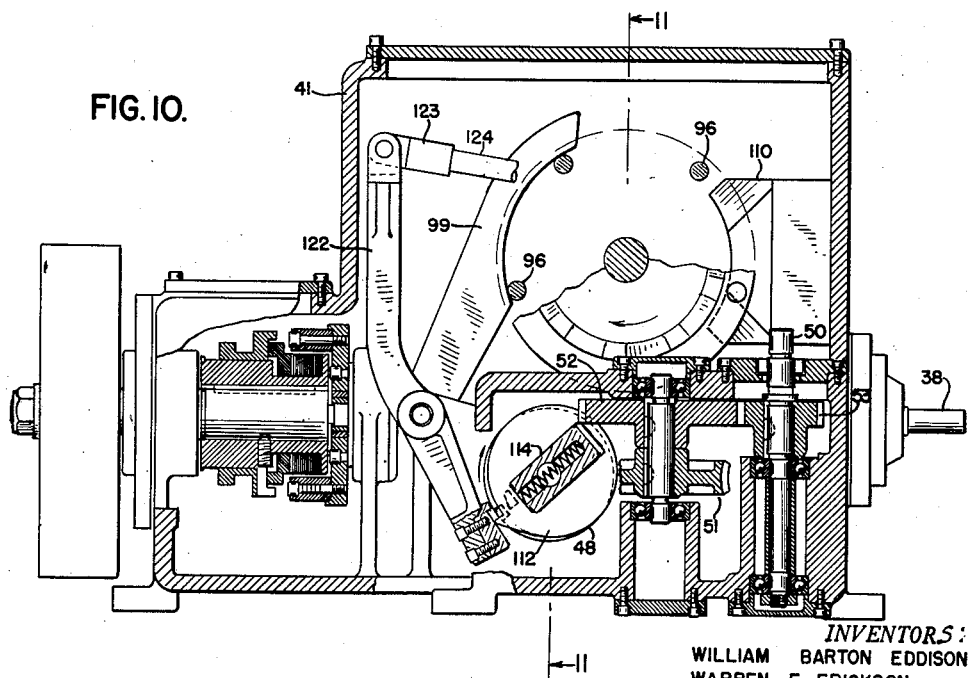
Fig. 10 is a section taken on line 10—10 of Fig. 9.

Returning to the trip mechanism in gear box 41, and Figs. 7 to 11 and 14 to 21, inclusive, it is desirable to provide that the stopping and automatic starting of metering wheel 8 and of mechanisms 16 and 17 be correlated with the continued operation of the machine to provide for accurate entrance of the bottles and seals into the machine without jamming.

For this purpose the trip mechanism comprises an escapement mechanism and time delay cam mechanism to provide a positive tripping of clutches 48 and 58 to open position following each initial pivoting of trigger 7 to a no bottle position across the path of the bottles.

The escapement mechanism comprises a bracket 82 inside gear box 41 carrying an escapement shaft 83 suitably mounted for free rotation in end bearings in the bracket.

The shaft 83 carries a pin bracket 84 and an escapement arm 85 having opposed escapement pins 86 and 87, respectively. The pin bracket 84 and escapement arm 85 are pivotally biased relative to each other on shaft 83 by means of a spring 88 between lugs thereon and which tends to maintain the escapement pins 86 and 87 in extended operable position.

The pine bracket 84 carries a control pin 89 extending upwardly therefrom in the path of a lever 90 secured to the lower end of shaft 63, so that as the latter is turned in response to a movement of trigger 7 into the path of bottles 5 on conveyor 3 the lever 90 engages the pin 89 and pivots pin bracket 84 in a direction withdrawing the escapement pin 86 from the cam arm 91 of the cam delay mechanism. A spring 92 is disposed between a part of the pin bracket 84 and the escapement bracket 82 to bias the bracket 84 in a direction tending to maintain escapement pin 86 under cam arm 91 at all times.

The spring 92 is purposely weaker in its effect than spring 64 since the two springs oppose each other during the initial pivoting of trigger 7 across the bottle path and spring 64 must be capable of retracting escapement pin 86 from beneath cam arm 91 and against spring 92.

When lever 90 engages pin 89 and pivots bracket 84 to withdraw escapement pin 86 from cam arm 91 against spring 92, the spring 88 pivots escapement arm 85 in the same direction to insert escapement pin 87 beneath cam arm 91. During this operation of the escapement, cam arm 91 drops a short amount as shown by comparing Figs. 15 and 16, sufficient to prevent the escapement pin 86 from entering beneath the cam arm 91 in the event the trigger 7 should be returned to a side position by bottles engaging the same.

The time delay cam mechanism comprises a pin wheel 93 keyed to a shaft 94 mounted in suitable bearings in gear box 41 and continuously driven by a gear 95 meshing with drive worm 43.

The pin wheel 93 carries a plurality of circumferentially spaced transverse pins 96 disposed parallel to the shaft 94, and adapted to traverse axially between a normal retracted position wherein the rear ends are flush with a retainer ring 97 on the rear side of wheel 93 and the forward ends protrude forwardly of the wheel, and an extended actuating position wherein the forward ends are flush with a forward retaining ring 98 and the rear ends extend to the rear of the wheel and are adapted to engage and actuate the clutch arm 99 during rotation of the pin wheel.

The pin wheel 93 carries a cam ring 100 concentrically disposed on the front of the wheel adjacent the pin retaining ring 98 and presenting five lobes 101 spaced equally circumferentially of the wheel and with valleys or cam depressions 102 therebetween.

The cam arm 91 is pivotally disposed adjacent the front of pin wheel 93 and carries a roller 103 which is adapted to ride upon cam ring 100, and which is normally retained spaced forwardly out of contact with the cam ring by reason of the escapement pin 86 beneath arm 91. The arm 91 is biased toward the pin wheel 93 by means of compression spring 104 between arm 91 and a cover plate 105 of gear box 41.

When trigger 7 initiates an escapement actuation and withdraws escapement pin 86 from beneath cam arm 91 and inserts escapement pin 87 beneath the cam arm 91, a projection 106 on the escapement arm 85 is moved into the path of a set of five cam trips 107 on the outer circumference of pin wheel 93 and which are disposed to cam arm 85 pivotally to withdraw the escapement pin 87 from the cam arm 91 and permit the latter to be moved by spring 104 toward the face of the pin wheel until roller 103 engages the top of a lobe 101.

Thereafter the roller 103 rides on cam ring 100 following in and out into the valleys 102 and over humps or lobes 101. Each time the cam arm 91 follows roller 103 as the latter rides into a cam depression 102, a pin cam 108 on the end of cam arm 91 engages and pushes a corresponding pin 96 to the rear of the pin wheel 93 where the rear end of the pin will engage the clutch arm 99 as the wheel rotates it against the inner arcuate edge 109 of the clutch arm.

Successive pins 96 retain the clutch arm 99 in actuated position as wheel 93 continues to rotate, and so long as roller 103 rides on cam ring 100 the succesive pins will be moved into position for this purpose.

One of the five lobes 101 of the cam is higher than the others and raises cam arm 91 sufficiently to permit escapement pin 86 to enter beneath it in response to spring 92 provided that a bottle 5 is holding trigger 7 to one side of the bottle path at the moment roller 103 rides over the high lobe. If trigger 7 still reports an absence of bottles, escapement pin 86 will be held against entering beneath cam arm 91 by spring 64 and roller 103 will pass the high lobe and continue on cam ring 100 for a full revolution of pin wheel 93.

As the pins 96 pass clutch arm 99 and leave the arcuate edge 109 thereof they pass successively under a fixed return cam 110 which returns the pins to normal retracted position as explained above. The pins 96 stay in actuated position for only about 180°, or half the revolution of the pin wheel 93. The arcuate edge 109 extends for about 80° or nearly a quarter of the revolution of pin wheel 93 so that where successive pins 96 are actuated by cam arm 91 the second pin will engage edge 109 before the first pin leaves the edge.

Gear 95 which drives the shaft of pin wheel 93 is approximately five times the size of gear 44 which is on clutch shaft 45 whereby the latter rotates five times for every rotation of the pin wheel 93.

Clutch lever 99 has an arm 111 which has its outer free end disposed adjacent a cam disc 112 carried by the driven member 113 of clutch 48 on shaft 47. The cam disc 112 has a transverse slot 114 therein for receiving the generally rectangular spring housing 115 projecting from the face of the driven member 113. The slot 114 is longer than housing 115 to provide for a limited diametric movement of disc 112 on the face of member 113. A spring 116 extending diametrically of member 113 in housing 115 has one end engaging disc 112 to bias the same to a normal position wherein a hump 117 on the outer circumference thereof protrudes farthest from the axis of rotation thereof.

When clutch lever 99 is actuated by a pin 96 the free end of arm 111 moves toward the edge of disc 112 and into the path of hump 117 on the disc. When the hump 117 engages arm 111 the disc 112 is moved diametrically against the spring 116 and releases a lug 118 on the face of the disc from engagement with a driver lug 119 on the face of clutch driver 46.

When clutch lever 99 is again moved to normal position the arm 111 is withdrawn from hump 117 on cam disc 112 and a shifting of the disc by spring 116 effects a reengagement of the lugs 118 and 119 by moving lug 118 into the path of the continuously rotating lug 119.

The disc 112 is secured on member 113 by means of a plate 120 secured by screws to the face of housing 115.

The lugs 118 and 119 of clutch 48, when in engagement with each other, effect driving of shaft 47 and worm 49 thereon which in turn drives the metering wheel 8. When lugs 118 and 119 are disengaged the shaft 47 and worm 49 stop turning and metering wheel 8 stops, while clutch driver plate 46 and lug 119 continue to rotate at a rate approximately five times that of pin wheel 93.

By constructing the cam end of arm 111 with a lug 121, and hump 117 with a radial forward side to be engaged by the lug, it is possible to prevent over-run of the metering wheel from inertia forces at the time of stopping.

The worm 49 is self-locking to prevent any over-run tendency of the metering wheel 8 during normal driving of the wheel, by reason of the pressure of bottles against the wheel from the continuous operation of conveyor 3 urging the bottles forwardly at all times.

A single pin 96 will hold clutch lever 99 actuated to hold lugs 118 and 119 disengaged for a little more than a full revolution of clutch driver plate 46. Each revolution of driver 46 corresponds, when driving shaft 47, to one eighth of a revolution of the metering wheel 8, the equivalent of a single bottle pocket on the metering wheel, there being eight pockets in the circumference of the metering wheel.

The lugs 118 and 119 are so related that the hump 117 always engages arm 111 at a position in the revolution of metering wheel 8 in which the wheel stops the passage of bottles along conveyor 3, and so that when the lugs are reengaged they start the rotation of the metering wheel in correlation to the drive of the machine so that the first bottle passing the metering wheel registers with a pocket of pocket wheel 10 and enters on table 4 in registry with a clamp 9 thereon.

For the purpose of stopping mechanisms 16 and 17 upon actuation of clutch lever 99, a second arm 122 extending upwardly from the pivotal body of the lever has a clevis 123 pivotally secured on its upper end. A clutch rod 124 is secured to the clevis 123 and extends through the wall of gear box 41 toward the seal handling mechanism.

A spring 125 disposed on rod 124 between the wall of gear box 41 and a threaded collar 126 on the outer end of the rod biases the latter in a direction to move arcuate edge 109 into the path of pins 96, and arm 111 out of engagement with cam disc 112.

A second rod 127 links the outer end of clutch rod 124 to a lever 128 keyed on a hollow vertical shaft 129 mounted in suitable bearings in a fixed housing 130 beneath the gear housing 131 carrying mechanisms 15, 16, 17 and 18. The inner surface of hollow shaft 129 is splined to receive the lower splined end of a vertical shaft 132 carried by suitable bearings in vertically adjustable gear housing 131. The upper end of spline shaft 132 carries a lever 133 which engages a depending clutch arm 134 to actuate clutch 58 in the drive for mechanisms 16 and 17.

Figure 23:
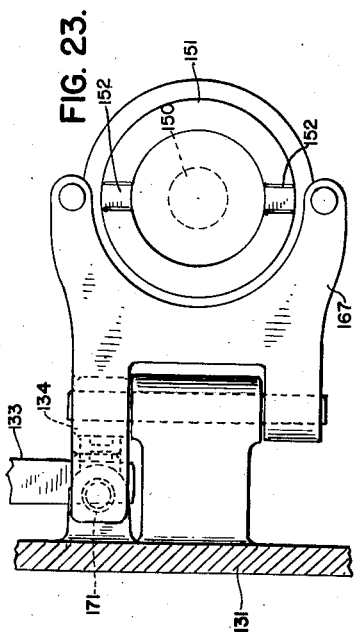
Fig. 23 is a horizontal section taken on line 23—23 of Fig. 22.

As explained in the copending application first referred to above and shown in Figs. 5, 6, 22 and 23, the mechanisms 16 and 17 are driven from main drive shaft 38 by a worm gear 135 on the shaft driving a cross shaft 136 extending beneath table 4 and housing 131. Cross shaft 136 has a beveled gear (not shown) on its rear end for driving table 4 through a train of gears, and a beveled gear 137 on its front end which drives a vertical hollow shaft 138 mounted in suitable bearings in a housing 139 on the base of the machine.

The shaft 138 is splined on the inside to receive the lower splined end of a vertical shaft 140 carried by housing 131. Shaft 140 has a spur gear 141 in housing 131 which drives an idling gear 142 which in turn drives a spur gear 143 on a vertical shaft 144.

A beveled gear 145 on the upper end of shaft 144 drives a pair of miter gears 146 and 147 on a cross shaft 148 and which in turn drive a beveled gear 149 on the lower end of a shaft 150 disposed axially of shaft 144.

The clutch 58 comprises a drive plate 151 on the upper end of shaft 150 having a pair of diametrically opposite beveled radial grooves 152 in its upper surface adapted to selectively receive a lug 153 depending from the free end of a clutch rocker arm 154. The rocker arm 154 is pivotally secured on the lower side of a clutch plate 155 carried by the lower end of a vertical shaft 156 axially aligned with shaft 150 above the same. A spring 157 in a bore in shaft 156 biases rocker arm 154 downwardly to maintain lug 153 in a groove 152 for driving of shaft 156 at all normal times when seals are called for.

Shaft 156 is connected by means of a beveled gear 158 on its upper end to a corresponding gear on an angular shaft 159 which in turn drives shaft 25 of stripper disc 23 by means of a crank 160 on shaft 159, link 161 and a second crank 162 on shaft 25, and drives shaft 29 of spider 27 by means of gears 163 and 164 on the respective shafts.

For the purpose of providing the dwell in oscillation of stripper disc 23 and in rotation of spear spider 27, the housing 165 for cross shaft 148 is linked to a crank 166 on the upper end of spline shaft 140, whereby the oscillation of the shaft 148 on the axis for shafts 140, 144, 150 and 156 is twice for every revolution of shaft 144 and produces a dwell for every 180° of rotation for shaft 150.

The clutch arm 134 is integral with a pivotal fork 167 the outer ends of which are disposed beneath the corresponding diametrically opposite positions for the outer end of rocker arm 154 at the time of successive dwells in the rotation of the rocker arm. Actuation of the clutch arm 134 by reason of actuation of clutch lever 99 is timed to occur only at a time of dwell for rocker arm 154 so that clutch arm 134 will lift the outer ends of fork 167 at that time and one of the arms of the fork will lift the rocker arm 154 and remove lug 153 from its recess or groove 152, thereby disconnecting the drive for disc 23 and spider 27 at a time when both are dwelling.

A pin 168 on the top of rocker arm 154 is disposed to enter a recess 169 in the bearing housing 170 for shaft 156 when the rocker arm is lifted by the fork 167, to lock disc 23 and spider 27 against accidental displacement while the drive is disconnected therefrom.

When clutch arm 99 returns to normal position under the biasing of spring 125 fork 167 drops out of the way of rocker arm 154 and the latter drops with lug 153 engaging the top of rotating driver plate 151 until the next recess or groove 152 registers with the lug and receives it to rotate the rocker arm with driver plate 151 and thereby drive shaft 156. A spring 171 normally biases clutch arm 134 and its fork 167 away from engagement with rocker arm 154.

The invention provides for the automatic stopping of both the metering wheel and the initial seal handling mechanism upon the absence of a bottle or bottles ahead of the metering wheel while retaining a predetermined number of bottles adjacent the intake of the metering wheel so that no jamming of bottles can occur. The starting of the metering wheel and seal handling mechanism is coordinated to provide a registry of bottles and seals with the continuously operating mechanism of the machine.

When the invention is applied to machines handling other containers than bottles or to machines for filling, capping, labeling and the like it will be understood that the construction for the metering mechanism may have to be modified for the special application of it to the machine.

It is believed that the metering mechanism of the invention may have application in fields of assembly and packaging other than container and bottle filling, capping, stamping, labeling or sealing.

Various embodiments of the invention may be employed within the scope of the accompanying claims which particularly point out and distinctly claim the subject matter regarded as the invention.

We claim:

1. In combination with a conveyor for feeding objects, a metering device disposed adjacent the conveyor and adapted to separate the objects on the conveyor by holding back incoming objects and releasing successive objects to continue on the conveyor a predetermined distance apart, object detecting means disposed adjacent the conveyor ahead of said metering device a distance corresponding to the space occupied by at least three abutting objects on the conveyor, means responsive to said object detecting means to stop said metering device and prevent objects from passing the same upon the detection of the absence of an object at the position of said detecting means, and means responsive to said detecting means to re-start said metering device upon the sustained presence of an object at the position of said detecting means, said last named means additionally serving to time the operation of said metering device upon re-starting thereof in the same time phase as said metering device operated prior to such stopping thereof.

2. The construction of claim 1 in which means are provided to delay the restarting of the metering device a sufficient time to assure the static presence of an object at the position of said detecting means and a predetermined substantial number of objects ahead of the metering device.

3. In a machine of the class described, the combination comprising a conveyor for feeding containers to the machine, a metering device disposed adjacent the conveyor and adapted to separate the containers thereon by holding back incoming containers and releasing successive containers to continue on the conveyor in predetermined spaced apart relation, container detecting means disposed adjacent said container ahead of said metering device a distance corresponding to the conveyor space occupied by several abutting containers, means responsive to said container detecting means to stop said metering device and prevent containers from passing the same and to stop at least a part of said machine upon the detection of an absence of containers at the position of said detecting means, and means responsive to said detecting means to restart said metering device upon the sustained presence of an object at the position of said detecting means, said last named means additionally serving to time the operation of said metering device upon restarting thereof in the same time phase as said metering device operated prior to such stopping thereof.

4. The construction of claim 3 in which means are provided to delay the restarting of the metering device until a minimum substantial number of containers are disposed in generally abutting relation ahead of the metering device on said conveyor.

5. In a machine for assembling successive pairs of parts fed to continuously operating assembling means at an assembling zone by separate conveyors, one of which conveyors individually handles the corresponding parts to deliver the same to the assembly zone in timed sequence, and the other of which floatingly supports the other corresponding parts and carries them in succession to the assembling zone, means to supply parts to said first named conveyor, a metering device associated with said last named conveyor to separate the parts thereon by holding back incoming parts and releasing successive parts to continue on the conveyor a predetermined distance apart to deliver the same in timed sequence with the delivering of the other corresponding parts by said first named conveyor to said assembling zone, detecting means disposed ahead of said metering device to detect the presence and absence of parts feeding to the metering device, and means responsive to said detecting means upon an indication of an absence of parts approaching said metering device to stop said metering device and the supplying of parts to said first named conveyor.

6. The construction of claim 5 in which means are provided to restart said metering device and the parts supply means for said first named conveyor in timed sequence to the continuous operation of the assembling means.

7. The construction of claim 5 in which said last named means comprises throw-out clutches adapted to stop said metering device and said supply means at a predetermined position in the operation of each, and means to restart said metering device and the parts supply means in timed relation to the continuously operating assembling means whereby each part delivered to the assembling zone has a corresponding part to be assembled therewith.

8. In a machine for applying members, such as caps, stamps, labels and seals, to containers such as bottles and the like, a flat top moving conveyor disposed to carry containers to the machine, guide members along the sides of said conveyor to retain the containers in a single file movement along the conveyor, a rotary metering wheel having spaced pocket recesses in its outer circumference adapted to receive corresponding containers and disposed with its marginal portion overlapping said flat top conveyor to block the passage of containers thereon except as each recess of the wheel releases a container for continued travel on the conveyor as the wheel rotates, a pivotal trigger arm normally spring biased to extend across the path of the incoming containers at a predetermined distance ahead of the metering wheel corresponding to the space required for several abutting containers, and a drive for said metering wheel comprising a throw-out clutch and means responsive to the actuation of said trigger arm by the spring bias thereon in the event of an absence of containers passing the same to open said clutch and stop said metering wheel, said pivotal trigger arm letting containers pass the same toward said metering wheel freely at all times.

9. The construction of claim 8 in which said last named means of said drive includes escapement means to time the opening of the clutch in coordination with the working cycle of the machine.

10. The construction of claim 8 in which said last named means of said drive includes escapement means to time the opening of the clutch in coordination with the working cycle of the machine, and time delay means to prevent closing of the clutch until the reserve containers ahead of the metering wheel reach back to the trigger arm.

11. The construction of claim 8 in which the drive for said metering wheel includes a self-locking means between the throw-out clutch and metering wheel to prevent overrunning of the latter.

12. In a machine for applying tubular seals and the like to bottle tops and the like wherein a plurality of successive seals are always in the process of being transferred from the magazine supply to a zone of application to the bottles and successive bottles are fed to the machine by a smooth top continuously moving conveyor which floats the bottles successively to mechanism for holding the same in registry to seal applying means, a metering wheel disposed adjacent the bottle conveyor and adapted to release the bottles one by one in predetermined spaced relation for continuing movement on the conveyor, said metering wheel being spaced ahead of the seal applying zone a distance in which the number of bottles advancing to the seal applying zone from the metering wheel at any given time matches with a corresponding number of seals being transferred from the magazine supply to the seal applying zone, trigger bottle detecting means disposed ahead of said metering wheel and adjacent the conveyor to detect the presence and absence of bottles passing the trigger means on their way to the metering wheel, and means responsive to a detection of an absence of a bottle by said trigger means to stop said metering wheel and the means for supplying of seals from the magazine supply in correlation while the machine continues to apply the seals which are moving toward the applying zone to bottles also moving toward and through the applying zone, the last seal being adapted to be applied to the last bottle.

13. In a machine for applying tubular seals and the like to bottle tops and the like wherein a plurality of successive seals are always in the process of being transferred from the magazine supply to a zone of application to the bottles and successive bottles are fed to the machine by a smooth top continuously moving conveyor which floats the bottles successively to mechanism for holding the same in registry to seal applying means, a metering wheel disposed adjacent the bottle conveyor and adapted to release the bottles one by one in predetermined spaced relation for continuing movement on the conveyor, said metering wheel being spaced ahead of the seal applying zone a distance in which the number of bottles advancing to the seal applying zone from the metering wheel at any given time matches with a corresponding number of seals being transferred from the magazine supply to the seal applying zone, trigger bottle detecting means disposed ahead of said metering wheel and adjacent the conveyor to detect the presence and absence of bottles passing the trigger means on their way to the metering wheel, means responsive to a detection of an absence of a bottle by said trigger means to stop said metering wheel and the means for supplying of seals from the magazine supply in correlation while the machine continues to apply the seals which are moving toward the applying zone to bottles also moving toward and through the applying zone, the last seal being adapted to be applied to the last bottle, said responsive means including escapement means which require a stopping of the metering wheel after a movement of the trigger means to a no-bottle position regardless of the immediate moving of the trigger means to a bottle position by more bottles passing the trigger means, and means to reset the escapement following a predetermined time of stoppage of the metering wheel.

14. In a machine for applying tubular seals and the like to bottle tops and the like wherein a plurality of successive seals are always in the process of being transferred from the magazine supply to a zone of application to the bottles and successive bottles are fed to the machine by a smooth top continuously moving conveyor which floats the bottles successively to mechanism for holding the same in registry to seal applying means, a metering wheel disposed adjacent the bottle conveyor and adapted to release the bottles one by one in predetermined spaced relation for continuing movement on the conveyor, said metering wheel being spaced ahead of the seal applying zone a distance in which the number of bottles advancing to the seal applying zone from the metering wheel at any given time matches with a corresponding number of seals being transferred from the magazine supply to the seal applying zone, bottle detecting means disposed ahead of said metering wheel and adjacent the conveyor to detect the presence and absence of bottles passing the detecting means on their way to the metering wheel, means responsive to a detection of an absence of a bottle by said trigger means to stop said metering wheel and the means for supplying of seals from the magazine supply in correlation while the machine continues to apply the seals which are moving toward the applying zone to bottles also moving toward and through the applying zone, the last seal being adapted to be applied to the last bottle, and means to prevent overrunning of the metering wheel under the biasing influence of bottles on the continuously moving conveyor.

15. The construction of claim 14 in which the last named means comprises a self-locking worm gear in the drive for said metering wheel and disposed between the metering wheel and its stopping means.

16. In a machine for handling bottles, a flat top conveyor for feeding floating bottles to the machine, a metering wheel disposed adjacent the conveyor and having a series of circumferentially spaced pockets therein for receiving corresponding individual bottles and releasing the same one by one for continuing movement on the conveyor in spaced relation toward the machine, drive means including a clutch for driving said metering wheel, a trigger arm biased pivotally across the path of the bottles at a distance ahead of the metering wheel corresponding to the space required by a plurality of abutting bottles on the conveyor, said bottles pivoting said trigger arm to one side as they pass the same, escapement means actuated by said trigger arm upon pivoting into the path of the bottles, cam delay mechanism initiated by actuation of said escapement means and which first opens the clutch stopping the metering wheel and thereafter resets the escapement means and closes the clutch, and means to prevent resetting of the escapement means and closing of the clutch unless said trigger arm is pivoted to one side of the conveyor by the presence of bottles.

17. The construction of claim 16 in which said escapement means is made inoperable during operation of said cam delay mechanism and spring means urges the escapement toward a reset position, and the operative connection between said trigger arm and escapement means is in one direction only whereby the trigger arm is free to return to one side of the conveyor when bottles pass it without a resetting of the escapement and the resetting of the escapement in response to a cycle of said cam delay mechanism terminates further cycling of said delay mechanism.

18. In apparatus of the class described, a clutch to be actuated, timing mechanism for determining the time of actuation of the clutch, a pivotally mounted trigger arm to control the actuation of said timing mechanism, and spring means biasing said trigger arm in one direction, said trigger arm being actuated in the opposite direction by mechanical means in the actuation of the apparatus, and said timing mechanism comprising a rotary pin wheel having a series of transverse circumferentially spaced pins therein, each pin being disposed normally with one end protruding on the face of the wheel and adapted to be pushed to protrude the opposite end of the pin into the path of a clutch actuating lever, a cam ring on the face of said wheel and having lobes and intermediate valleys corresponding in number to the number of said pins, a pivotal arm carrying a roller adapted to ride upon said cam ring as the wheel rotates with the free end of the pivotal arm disposed to engage a pin and push it rearwardly of the face of the wheel each time the roller rides into a valley of the cam ring, a fixed cam adjacent the back side of the wheel to engage the pins and return them to normal position after they leave said clutch lever, means normally biasing said pivotal arm toward the face of said wheel to effect engagement of the roller with said cam ring, and an escapement mechanism comprising a pair of escapement members carried by corresponding arms on separate members pivotal on the same axis, spring means biasing said members pivotally apart in a direction to extend said escapement members, one of said escapement members being normally disposed to hold said pivotal arm away from said pin wheel while the clutch is in one position, means to pivot said one escapement member from said pivotal arm and insert the opposite escapement member into operative support of said pivotal arm in response to a movement of said trigger arm in one direction, said pivotal lever moving an increment of the distance toward contact of the roller with the cam ring during the change of said escapement members and blocking the return of said one escapement member thereafter, and cam means on the wheel adapted to engage and throw out the second escapement member whereby the pivotal arm is moved toward the face of the wheel to effect engagement between the roller and cam ring, said last cam means being disposed to always effect initial engagement between the roller and cam ring at a lobe or high point on the cam ring, one of said lobes on said cam ring being higher than the others whereby it lifts the pivotal arm to a position where said first escapement member enters beneath the arm and holds the roller out of engagement with the rest of the cam ring, the escapement being reset for another cycle by this latter actuation of the pivotal arm.

19. In combination with a conveyor for feeding objects, a metering device disposed adjacent the conveyor and adapted to separate the objects on the conveyor by holding back incoming objects and releasing successive objects to continue on the conveyor a predetermined distance apart, object detecting means disposed adjacent the conveyor and ahead of said metering device a distance corresponding to the space occupied by at least three abutting objects on the conveyor, and trip means responsive to said object detecting means to stop said metering device and prevent objects from passing the same upon an indication for said detecting means of the absence of any object at the position of said detecting means and to prevent restarting of the metering device merely by a subsequent indication for said detecting means of an object passing the same, said detecting means letting objects pass the same toward said metering device freely at all times.

20. In combination with a conveyor for feeding objects, a metering device disposed adjacent the conveyor and adapted to separate the objects on the conveyor by holding back incoming objects and releasing successive objects to continue on the conveyor a predetermined distance apart, object detecting means disposed adjacent the conveyor and ahead of said metering device a distance corresponding to the space occupied by at least three abutting objects on the conveyor, trip means responsive to said object detecting means to stop said metering device and prevent objects from passing the same upon an indication for said detecting means of the absence of an object at the position of said detecting means and to prevent restarting of the metering device merely by a subsequent indication for said detecting means of an object passing the same, and means to delay the restarting of the metering device a sufficient time to assure the starter presence of an object at the position of said detecting means and a predetermined substantial number of objects ahead of the metering device, said detecting means letting objects pass the same toward said metering device freely at all times.

21. In a machine of the class described, the combination comprising a conveyor for feeding containers to the machine, a metering device disposed adjacent the conveyor and adapted to separate the containers thereon by holding back incoming containers and releasing successive containers to continue on the conveyor in predetermined spaced apart relation, container detecting means disposed adjacent said container ahead of said metering device a distance corresponding to the conveyor space occupied by several abutting containers, and trip means responsive to said container detecting means to stop said metering device and prevent containers from passing the same upon an indication for said detecting means of the absence of a container at the position of said detecting means and to prevent restarting of the metering device merely by a subsequent indication for said detecting means of a container passing the same, said detecting means letting containers pass the same toward said metering device freely at all times.

22. In a machine of the class described, the combination comprising a conveyor for feeding containers to the machine, a metering device disposed adjacent the conveyor and adapted to separate the containers thereon by holding back incoming containers and releasing successive containers to continue on the conveyor in predetermined spaced apart relation, container detecting means disposed adjacent said container ahead of said metering device a distance corresponding to the conveyor space occupied by several abutting containers, and trip means responsive to said container detecting means to stop said metering device and prevent containers from passing the same upon an indication for said detecting means of the absence of a container at the position of said detecting means to prevent restarting of the metering device merely by a subsequent indication for said detecting means of a container passing the same, and means to delay the restarting of the metering device until a minimum substantial number of containers are disposed in generally abutting relation ahead of the metering device on said conveyor, said detecting means letting containers pass the same toward said metering device freely at all times.

References Cited in the file of this patent

UNITED STATES PATENTS

| | | |
|---|---|---|
| 704,480 | Leiger | July 8, 1902 |
| 1,799,106 | Laxo | Mar. 31, 1931 |
| 1,884,952 | Wright et al. | Oct. 25, 1932 |
| 2,542,200 | Kraeger | Feb. 20, 1951 |
| 2,599,220 | Bergmann | June 3, 1952 |
| 2,609,911 | Davis | Sept. 9, 1952 |
| 2,739,695 | Haycock | Mar. 27, 1956 |

UNITED STATES PATENT OFFICE

CERTIFICATE OF CORRECTION

Patent No. 2,909,017                                            October 20, 1959

William Barton Eddison et al.

It is hereby certified that error appears in the printed specification of the above numbered patent requiring correction and that the said Letters Patent should read as corrected below.

Column 12, line 59, for "trigger means" read -- detecting means --.

Signed and sealed this 26th day of April 1960.

(SEAL)
Attest:
KARL AXLINE
Attesting Officer

ROBERT C. WATSON
Commissioner of Patents